US011997086B1

(12) United States Patent
Grinman et al.

(10) Patent No.: US 11,997,086 B1
(45) Date of Patent: May 28, 2024

(54) SYSTEMS AND METHODS FOR IDENTITY VERIFICATION AND AUTHENTICATION

(71) Applicant: One Footprint Inc., New York, NY (US)

(72) Inventors: Alex Grinman, Brookline, MA (US); Eli Wachs, New York, NY (US)

(73) Assignee: One Footprint Inc., New York, NY (US)

( * ) Notice: Subject to any disclaimer, the term of this patent is extended or adjusted under 35 U.S.C. 154(b) by 204 days.

(21) Appl. No.: 17/868,431

(22) Filed: Jul. 19, 2022

(51) Int. Cl.
  *H04L 9/40* (2022.01)
(52) U.S. Cl.
  CPC ........ *H04L 63/0861* (2013.01); *H04L 63/083* (2013.01)
(58) Field of Classification Search
  CPC .......................... H04L 63/0861; H04L 63/083
  USPC .......................................................... 726/22
  See application file for complete search history.

(56) References Cited

U.S. PATENT DOCUMENTS

| 9,021,562 B1 * | 4/2015 | Buckingham | H04L 63/0838 705/72 |
| 2016/0087966 A1 * | 3/2016 | Saxman | H04L 63/102 726/4 |
| 2019/0028471 A1 * | 1/2019 | Andrade | H04L 63/0861 |
| 2023/0394458 A1 * | 12/2023 | Kurlas | G06Q 20/363 |

* cited by examiner

*Primary Examiner* — Michael S McNally
(74) *Attorney, Agent, or Firm* — Esplin & Associates, PC

(57) ABSTRACT

Systems and methods for facilitating identity verification and authentication for users are disclosed. Exemplary implementations may: receive items of personal information pertaining to a particular user, through an online platform associated with a particular organization; perform verification actions based on the received items; create a user data vault to securely store the received items; create a user token and transfer it to the online platform; receive an identity verification request on behalf of the particular user; initiate challenge protocols; responsive to the one or more challenge protocols completing satisfactorily, transfer the user token to the online platform; receive a validation request from a backend server of the particular organization, wherein the validation request includes the user token; access the user data vault based on the validation request; transfer a response to the backend server; and/or other steps.

20 Claims, 4 Drawing Sheets

SYSTEMS AND METHODS FOR IDENTITY VERIFICATION AND AUTHENTICATION

FIELD OF THE DISCLOSURE

The present disclosure relates to systems and methods for facilitating identity verification and authentication for users, in particular by using securely stored personal information in encrypted form.

BACKGROUND

Online identity verification systems are known. Online user authentication systems are known. Securing data security through cryptography is known, particularly for stored data.

SUMMARY

One aspect of the present disclosure relates to a system configured to facilitate identity verification and authentication for users. The system may be configured to receive items of personal information pertaining to a particular user, through an online platform associated with a particular organization. The system may be configured to perform verification actions based on the received items. The system may be configured to create a user data vault to securely store the received items. The system may be configured to create a user token and transfer it to the online platform. The system may be configured to receive an identity verification request on behalf of the particular user. The system may be configured to initiate challenge protocols, The system may be configured to, responsive to the one or more challenge protocols completing satisfactorily, transfer the user token to the online platform. The system may be configured to receive a validation request from a backend server of the particular organization, wherein the validation request includes the user token. The system may be configured to access the user data vault based on the validation request. The system may be configured to transfer a response to the backend server, and/or perform other steps.

Another aspect of the present disclosure relates to a method of facilitating identity verification and authentication for users. The method may include receiving items of personal information pertaining to a particular user, through an online platform associated with a particular organization. The method may include performing verification actions based on the received items; create a user data vault to securely store the received items. The method may include creating a user token and transfer it to the online platform. The method may include receiving an identity verification request on behalf of the particular user. The method may include initiating challenge protocols, The method may include, responsive to the one or more challenge protocols completing satisfactorily, transferring the user token to the online platform. The method may include receiving a validation request from a backend server of the particular organization, wherein the validation request includes the user token. The method may include accessing the user data vault based on the validation request. The method may include transferring a response to the backend server, and/or performing other steps.

As used herein, any association (or relation, or reflection, or indication, or correspondency) involving servers, processors, client computing platforms, users, online platforms, verification actions, user data vaults, cryptographic keys, tokens, requests, responses, challenge protocols, validations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
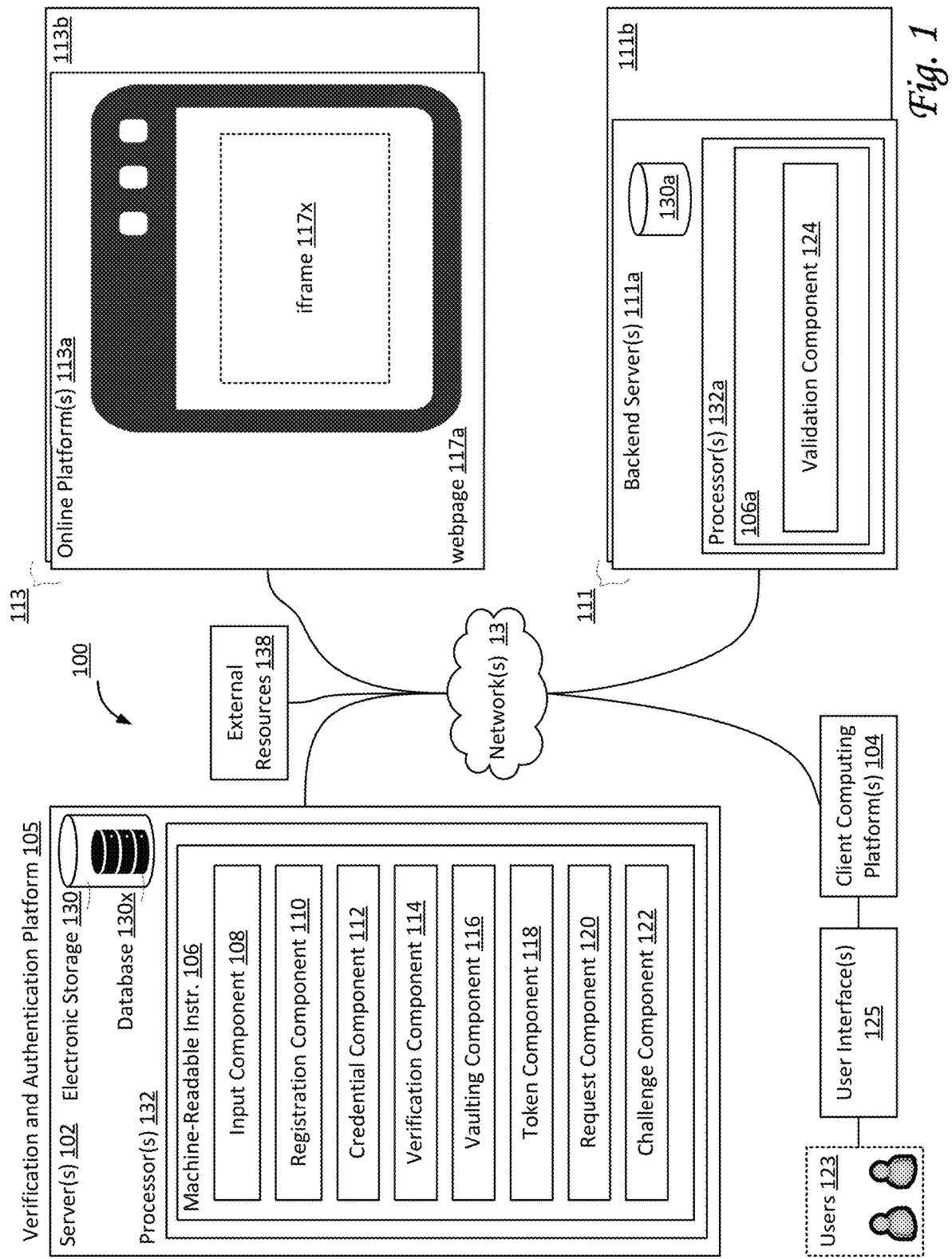
FIG. 1 illustrates a system configured to facilitate identity verification and authentication for users, in accordance with one or more implementations.

FIG. 1 illustrates a system 100 configured to facilitate identity verification and authentication for users, in accordance with one or more implementations. As used herein, verification of a user's identity involves the user proving they are who they say they are. By way of non-limiting example, this may be needed to obtain financial services, for job applications, and/or many other services. Typically, identity verification involves providing personal information (e.g., personally identifiable information, or PII), such as name, date of birth, telephone number, email address, social security number, home address, etc. Often, certain types of online services only require a new user to go through this type of verification once during onboarding (e.g., for Know Your Customer, or KYC, purposes). As used herein, authentication is the process of determining whether the user currently accessing a system or service is the same user who has previously been verified. Authentication can include any combination of things a user knows (e.g., when using security questions), or has in their possession, or is (e.g., when using facial recognition, biometric data, etc.). Identity validation is the process of determining whether identity data represents real data. By virtue of the systems and methods described herein, organizations can easily and securely verify an online user's identity (without needing to store PII) through the use of a user-specific token. A user can easily reuse this token for repeated authentication, even among different organizations. For example, identity verification for a different second (or third, fourth, etc.) organization may not require the same user to provide most or any of the same personal information again.

In some implementations, system 100 may include one or more of verification and authentication platform 105, one or more client computing platforms 104, one or more online platforms 113, one or more backend servers 111, one or more servers 102, electronic storage 130, one or more processors 132, one or more user interfaces 125, external resources 138, and/or other components. Verification and authentication platform 105 and server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. In some implementations, individual ones of users 123 may be associated with individual client computing platforms 104. For example, a first user may be associated with first client computing platform 104, a second user may be associated with second client computing platform 104, and so forth. In some implementations, individual user interfaces 125 may be associated with individual client computing platforms 104. For example, a first user interface 125 may be associated with first client computing platform 104, a second user interface 125 may be associated with second client computing platform 104, and so forth.

Server(s) 102 may be configured by machine-readable instructions 106. Machine-readable instructions 106 may include one or more instruction components. The instruction components may include computer program components (also referred to as "instruction components"). The instruction components may include one or more of an input component 108, a registration component 110, a credential component 112, a verification component 114, a vaulting component 116, a token component 118, a request component 120, a challenge component 122, a validation component 124, and/or other instruction components. Electronic storage 130a may be similar to electronic storage 130, though included in backend server(s) 111. Processors 132a may be similar to processors 132, though included in backend server(s) 111. Machine-readable instructions 106a may be similar to machine-readable instructions 106, though included in backend server(s) 111.

Input component 108 may be configured to receive information, including user input and information pertaining to users. In some implementations, input component 108 may be configured to receive information through one or more online platforms 113 (including but not limited to first online platform 113a, second online platform 113b, and/or other online platforms). One or more online platforms 113 may be associated with one or more organizations (including but not limited to corporations, service providers, not-for-profit organizations, and/or other organizations). For example, first online platform 113a may be associated with a first organization, second online platform 113b may be associated with a second organization, and so forth.

Individual online platforms 113 may host webpages and/or other online content or services. For example, in some cases, first online platform 113a may include a web server (not depicted) that hosts a webpage 117a (and/or a front end server, for the first organization). Information may be received by input component 108 through online platforms 113, e.g., first online platform 113a. In some implementations, information may be received through an interactive webpage such as, e.g., webpage 117a. In some implementations, webpage 117a may include an iframe 117x. For example, input component 108 may receive information through iframe 117x of webpage 117x.

Backend server(s) 111 are associated with organizations, online platforms 113, and/or frontend servers. For example, first backend server 111a may be associated with first online platform 113a and a first organization (e.g., a financial services provider), second backend server 111b may be associated with second online platform 113b and a second organization (e.g., an online service provider required to comply with KYC regulations), and so forth. Individual backend servers 111 may be configured to communicate with individual online platforms 113. Backend server(s) 111 may be configured by machine-readable instructions 106a, which may include one or more computer program components, such as validation component 124 and/or other instruction components.

In some implementations, input component 108 may receive one or more items of personal information (e.g., Personally Identifiable Information, or PII) pertaining to individual users. For example, for the first user, input component 108 may receive a first name, a first email address, a first date of birth, a first place of birth, a first nationality, a first telephone number, a first social security number, a first home address, etc. For example, for the second user, input component 108 may receive a second name, a second email address, a second date of second, a second place of birth, a second nationality, a second telephone number, a second social security number, a second home address, and so forth.

In some implementations, input component 108 may be configured to receive requests, including but not limited to identity verification requests. Requests may be received through one or more online platforms 113 (including but not limited to second online platform 113b, which may be a different online platform than the online platform a particular user used to register for identity verification originally). An individual identity verification request may be received on behalf of an individual user. An individual identity verification request may be a request to verification and authentication platform 105 to perform identity verification for a particular user. In particular, an individual identity verification request may be received on behalf of an individual user who has previously been registered by system 100. Response to successful identity verification, a user token may be transferred from verification and authentication platform 105 to a particular online platform 113. In some cases, the particular online platform 113 may transfer user tokens to the corresponding backend server 111 that is associated with the same organization.

In some implementations, input component 108 may be configured to receive information indicating a confirmation by a particular user. In particular, the confirmation may be that a particular organization is authorized (by the particular user) to use certain personal information pertaining to the particular user. For example, a particular confirmation may be received by second online platform 113b (associated with a second organization), confirming the second organization is authorized to use particular items of personal information pertaining to the particular user, even though the particular user originally registered for identity verification with a different online platform 113 associated with a different organization.

Registration component 110 may be configured to determine whether a particular user has been registered with system 100 and/or verification and authentication platform 105. Determinations by registration component 110 may be based on received personal information, such as, by way of non-limiting example, an email address. In some implementations, operations by other components of system 100, including but not limited to input component 108, may be based on determinations by registration component 110. In some implementations, determinations by registration component 110 may be based on a lookup (e.g., in a table or database) using a particular item of personal information (e.g., a hash of the received email address).

Credential component 112 may be configured to store credential information (sometimes simply referred to as "credentials") associated with users. Alternatively, and/or simultaneously, credential component 112 may be configured to effectuate the storage of items of credential information associated with users. In some cases, the individual credential information for an individual user may be stored locally on an individual client computing platform 104 that is associated with that individual user. In some implementations, credential information may include a biometric credential. For example, a biometric credential may include a private encryption key that is unlocked by biometric information of the individual user. By way of non-limiting example, biometric information may include one or more of a facial image (e.g., used for facial recognition and/or facial identification, such as FACEID™), fingerprint information, iris scan, voice sample, etc. This private encryption key may be stored securely locally (e.g., using a cryptographic coprocessor), on the individual client computing platform 104 that is associated with that individual user. The corresponding public key may be stored in a centralized manner, e.g., in electronic storage 130. In some implementations, credential information may be used as part of one or more challenge protocols, e.g., by challenge component 122. In some implementations, these private and public keys may be used as part of one or more challenge protocols, e.g., by challenge component 122.

Verification component 114 may be configured to perform and/or otherwise effectuate verification actions. In particular, verification actions may be based on particular personal information pertaining to a particular user. In some implementations, one or more of the verification actions may at least in part be performed by external providers of verification services, including but not limited to EXPERIAN™, LEXIS NEXSIS™, IDOLOGY™, EKATA™, VERIZON™, etc. For example, the existence or status of a phone number may be verified and/or confirmed by a telephone or telecommunications company. For example, the existence or status of a social security number may be verified and/or confirmed by a government-related service or department. In some cases, an external provider of verification services may inspect a government-issued identification document (or a photo thereof) for signs of fraud or tampering.

Vaulting component 116 may be configured to create user data vaults (e.g., user-specific data vaults) for secure information storage. Vaulting component 116 may be configured to securely store information, including but not limited to personal information such as PII, and particularly, store information in user data vaults. Information may be stored securely in encrypted form. In some implementations, encryption may be based on using an encryption key that is part of a cryptographic key pair (having a so-called public key and a private key). In some implementations, the encryption key used to encrypt personal information pertaining to a particular user may itself be specific to that particular user. In some implementations, a particular user data vault may be identified by a (user-specific) vault identifier.

Vaulting component 116 may be configured to access securely stored information from user data vault. For example, vaulting component 116 may access a particular user data vault based on a request, including but not to validation requests and/or other requests. In some implementations, system 100 includes an enclave service that provides functions and/or services performed on information stored in user data vaults, including but not limited to decryption of encrypted information. The enclave service may include an enclave proxy and an enclave. By way of non-limiting example, the enclave may be a NITRO ENCLAVE™ as may be provided by AWS™. The enclave proxy may provide secure access to and from the enclave service. The enclave proxy may communicate with the enclave over a secure local channel. One or more private keys (of one or more cryptographic key pairs) may be stored in the enclave. Accessing a particular user data vault may include an application programming interface (API) call to the enclave proxy. For example, a response to a validation request may include and/or be based on a response from the enclave proxy to the API call. In some implementations, an enclave may be a fully isolated virtual machine that can only communicate using a secure local channel, such as VSOCK™.

Figure 3:
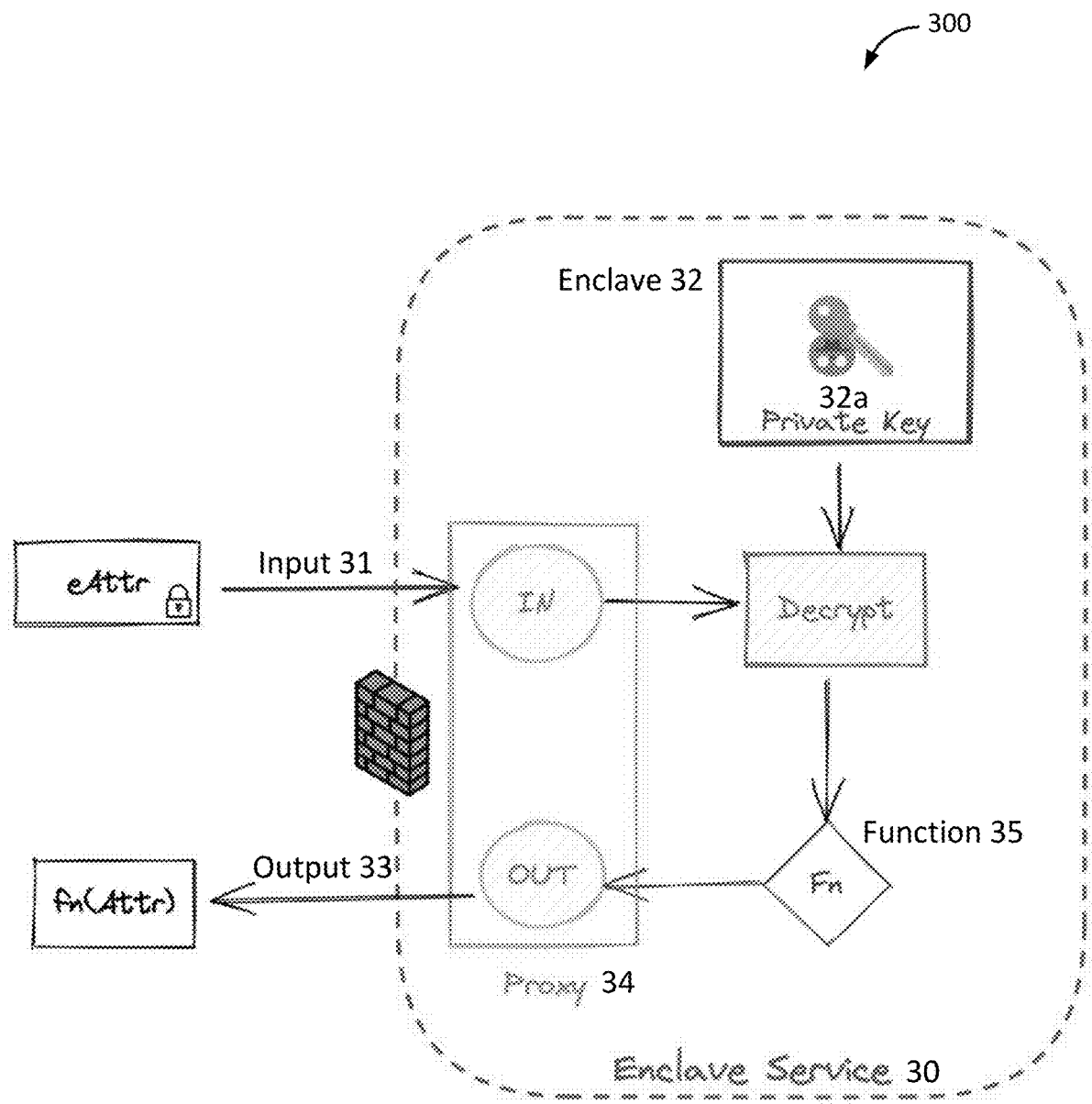
FIG. 3 illustrates an exemplary usage scenario of an enclave service as may be used in a system to facilitate identity verification and authentication for users, in accordance with one or more implementations.

By way of non-limiting example, FIG. 3 illustrates an exemplary usage scenario 300 of an enclave service 30 as may be used in system 100. Enclave service 30 may include an enclave 32 (storing private key 32a) and an enclave proxy 34. An encrypted item of personal information (here labeled "eAttr"), plus a function identifier (not depicted) form an input 31 into enclave services 30, particularly into enclave proxy 34. The encrypted item of personal information is decrypted using private key 32a, operated on by a function 35 (as identified by the function identifier) to produce an output labeled "fn(Attr)", and this resulting output 33 is transferred through enclave proxy 34 out of enclave service 30, to another component of system 100, such as, by way of non-limiting example, vaulting component 116 and/or request component 120.

Referring to FIG. 1, token component 118 may be configured to create user tokens that identify users. An individual user token may be user-specific. Token component 118 may be configured to transfer user tokens, e.g., to a particular online platform. In some implementations, individual user tokens may be specific to individual organization. For example, a particular user token may be scoped to a particular organization, such that only this particular organization can use the user token to send requests to request component 120. Certain operations by token component 118 may be performed responsive to, e.g., one or more challenge protocols completing successfully.

Request component 120 may be configured to receive requests, including but not limited to validation requests. For example, request component 120 may receive a validation request from a particular backend server associated with a particular organization. Individual validation requests may pertain to individual users. An individual validation request may include an individual user token (as created by token component 118). Request component 120 may be configured to transfer responses to requests. For example, request component 120 may transfer a response to a validation request to a particular backend server associated with a particular organization. In particular, the response may indicate a result of a verification, a validation, and/or another type of request. In some implementations, responses include an audit trail of how a particular user's identity has been verified. Preferably, responses contain no personal information, or at least no unencrypted personal information. For example, a particular response may be interpreted as "the social security number supplied matches the date of birth as stored." For example, another response may be interpreted as "the phone number supplied was verified to be non-fraudulent based on $3^{rd}$-party verification". In some cases, a response may merely indicate "pass" or "fail" (or "go" and "no-go") for a particular backend server associated with a particular organization. In some implementations, requests and corresponding responses may be made using one or more application programming interface (API) calls. For example, a particular user token may be a parameter or argument in a particular API call.

Challenge component 122 may be configured to initiate and/or perform one or more challenge protocols. For example, challenge component 122 may initiate a particular challenge protocol on a particular client computing platform 104 associated with a particular user. By way of non-limiting example, a challenge protocol on a personal cellphone (also referred to as "local authentication") may involve a facial scan such as FACEID™. Other types of local authentication, including but not limited to WEBAUTHN™ and FIDO™/ FIDO2™, are considered within the scope of this disclosure. Alternatively, and/or subsequently, a locally stored cryptographic key (e.g., a private key stored on the personal cellphone) may be used in another challenge protocol (e.g., using a corresponding public key stored in electronic storage 130, e.g., to encode a message, locally decode this message, and respond with the decoded message; or else to locally sign a message including some received random number, respond with this signed message, which proves possession of the private key). This is a different cryptographic key pair then the cryptographic key pair used to encrypt and decrypt personal information for a user data vault, since those private keys (i.e., for decryption) are stored securely, not on client computing platforms 104, but rather in electronic storage 130 or, more specifically, in an enclave. An individual challenge (or challenge protocol) may succeed (i.e., pass satisfactorily) or fail (e.g., be incorrect, incomplete, inacceptable, and/or otherwise not satisfactory).

Validation component 124 may be configured to communicate with one or more of verification and authentication platform 105, online platforms 113, and/or other components of system 100. Validation component 124 may transfer requests (including but not limited to validation requests) to verification and authentication platform 105, particularly to request component 120. In some implementations, validation component 124 may receive (and locally store) user tokens from online platforms 113, which may be used to create validation requests. Subsequent to sending a validation request to request component 120, validation component 124 may receive a response to that validation request. Preferably, responses contain no personal information, or at least no unencrypted personal information. In some implementations, requests and corresponding responses may be made using one or more application programming interface (API) calls. For example, a particular user token may be a parameter or argument in a particular API call.

Referring to FIG. 1, in some implementations, verification and authentication platform 105, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which components may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 125 may be configured to facilitate interaction between users and system 100 and/or between users and client computing platforms 104. For example, user interfaces 125 may provide an interface through which users may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, sensors to capture facial characteristics, biometric sensors, and/or other user interface devices configured to receive and/or convey user input and/or information from a user. In some implementations, user interface 125 may be configured to support face recognition, iris recognition, RFID implants, and/or other personalization technologies. In some implementations, one or more user interfaces 125 may be included in one or more client computing platforms 104. In some implementations, one or more user interfaces 125 may be included in system 100.

External resources 138 may include sources of information outside of system 100, external entities participating with system 100, and/or other resources. In some implementations, external resources 138 may include a provider of information which may be used by system 100. In some implementations, external resources 138 may include a provider of particular software-controlled applications which may be made available to users through system 100. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 130 may comprise non-transitory storage media that electronically stores information, including but not limited to a database 130x. The electronic storage media of electronic storage 130 may include one or both of system storage that is provided integrally (i.e., substantially non-removable) with server(s) 102 and/or removable storage that is removably connectable or capable of being coupled operationally to server(s) 102 via, for example, a port (e.g., a USB port, a firewire port, etc.) or a drive (e.g., a disk drive, etc.) or networked storage (e.g., network-attached storage (NAS), storage area network (SAN), etc.). In some implementations, electronic storage 130a included in first client computing platform 104a may include a first network-attached storage (NAS). In some implementations, electronic storage 130a included in second client computing platform 104b may include a second network-attached storage (NAS). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein. For example, database 130x may store user-specific information, including but not limited to user identifiers, vault identifiers, cryptographic keys, and/or other information.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information, whether local or remote, or both. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, and/or 124, and/or other components. Processor(s) 132 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 132 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 132 may be configured to execute one or more additional components that may perform some or all of the functionality attributed below to one of components 108, 110, 112, 114, 116, 118, 120, 122, and/or 124.

Figure 2A:
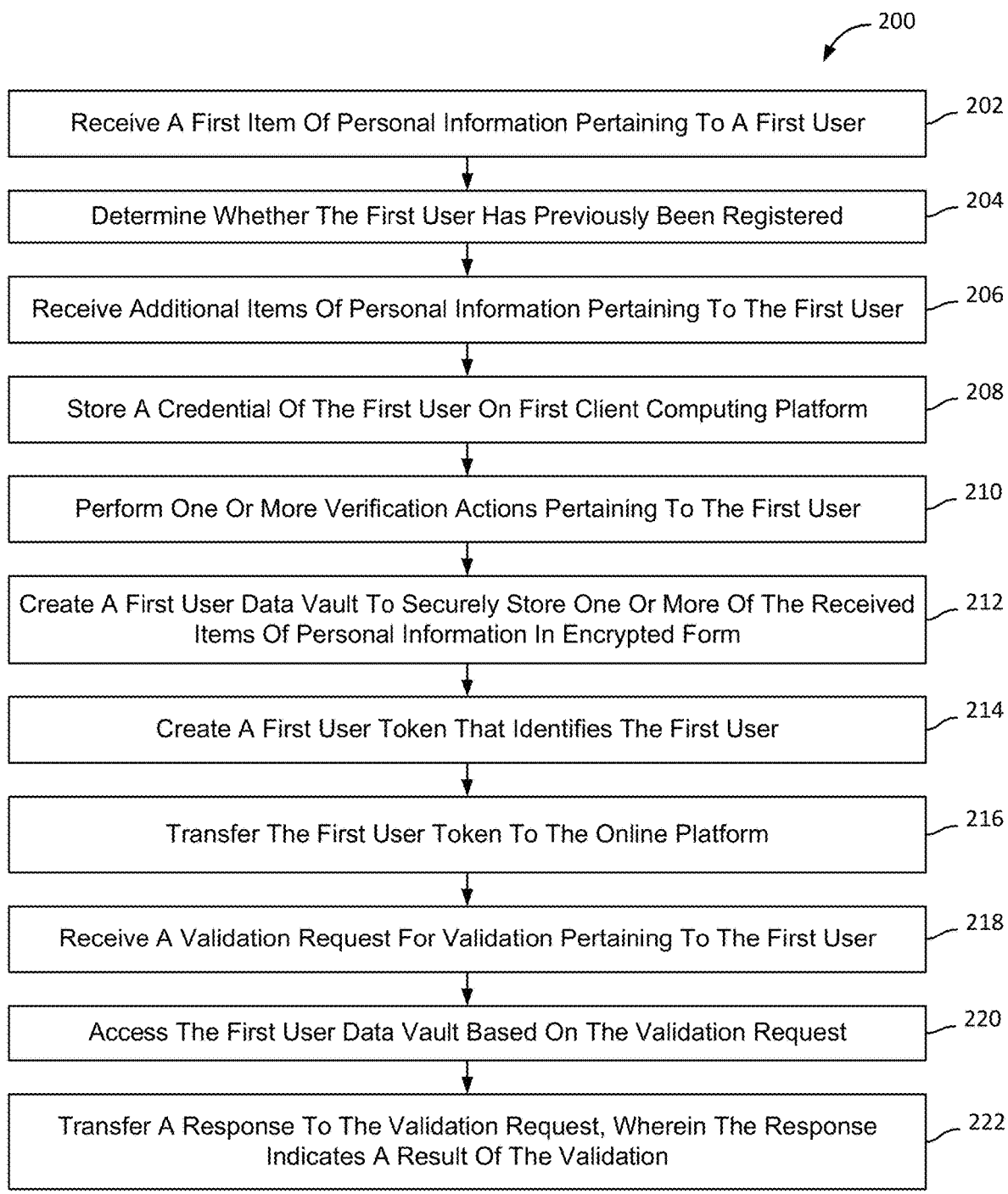
FIGS. 2A-2B illustrate one or more methods for facilitating identity verification and authentication for users, in accordance with one or more implementations.
Figure 2B:
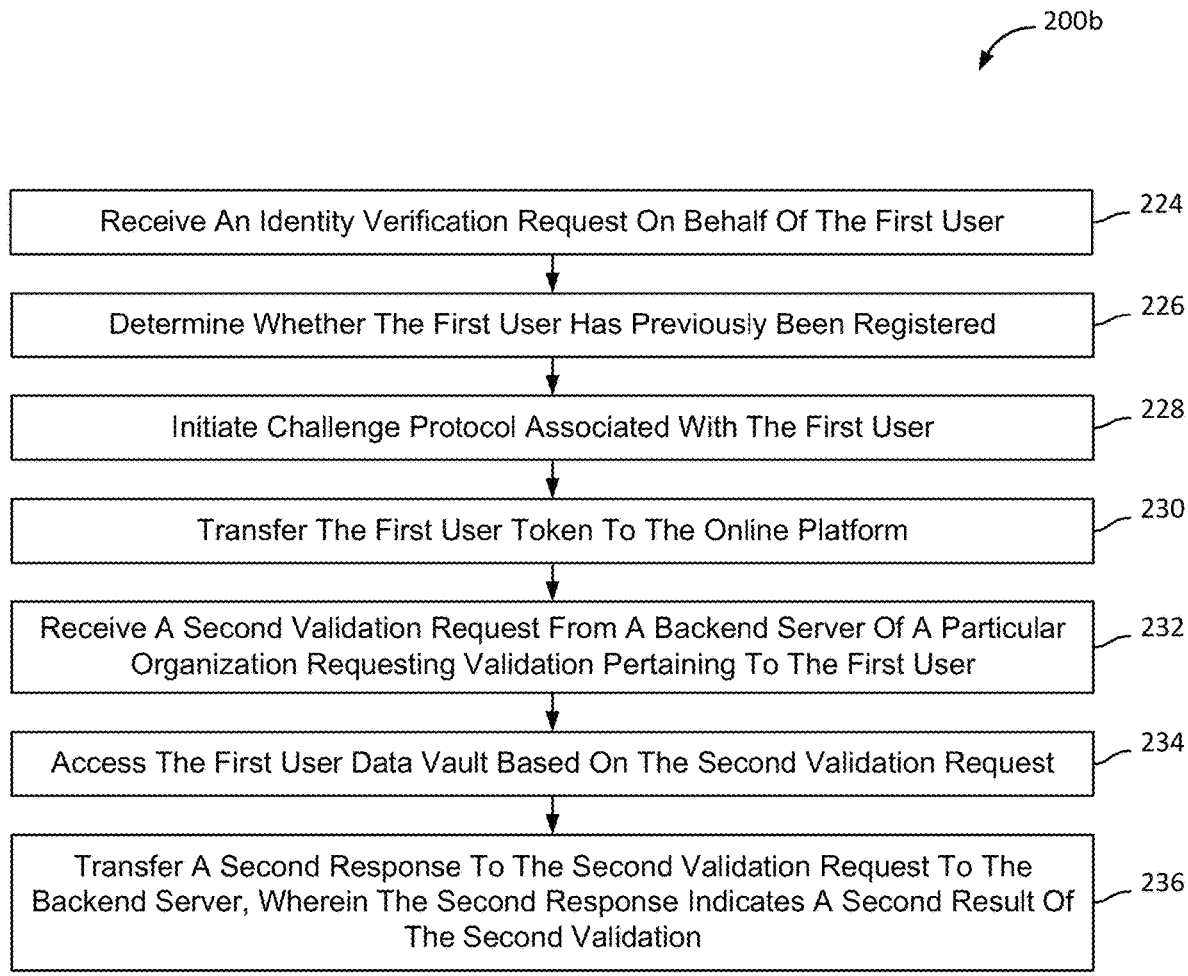

FIGS. 2A-2B illustrates one or more methods 200-200b for facilitating identity verification and authentication for users, in accordance with one or more implementations. The operations of these one or more methods presented below are intended to be illustrative. In some implementations, these one or more methods may be accomplished with one or more additional operations not described, and/or without one or more of the operations discussed. Additionally, the order in which the operations of these one or more methods are illustrated in FIGS. 2A-2B and described below is not intended to be limiting.

In some implementations, these one or more methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of these one or more methods in response to instructions stored electronically on an electronic storage medium. The one or more processing devices may include one or more devices configured through hardware, firmware, and/or software to be specifically designed for execution of one or more of the operations of these one or more methods.

At an operation 202, a first item of personal information pertaining to the first user is received, through an online platform associated with a particular organization. In some embodiments, operation 202 is performed by an input component the same as or similar to input component 108 (shown in FIG. 1 and described herein).

At an operation 204, it is determined whether the first user has previously been registered at the system, based on the first item of personal information. In some embodiments, operation 204 is performed by a registration component the same as or similar to registration component 110 (shown in FIG. 1 and described herein).

At an operation 206, responsive to determining the first user has not previously been registered, additional items of personal information pertaining to the first user are received. In some embodiments, operation 206 is performed by an input component the same as or similar to input component 108 (shown in FIG. 1 and described herein).

At an operation 208, responsive to determining the first user has not previously been registered, a biometric credential is stored that is associated with the first user on the first client computing platform. In some embodiments, operation 208 is performed by a credential component the same as or similar to credential component 112 (shown in FIG. 1 and described herein).

At an operation 210, one or more verification actions are performed based on one or more of the received items of personal information pertaining to the first user. In some embodiments, operation 210 is performed by a verification component the same as or similar to verification component 114 (shown in FIG. 1 and described herein).

At an operation 212, responsive to the one or more verification actions completing satisfactorily, a first user data vault is created to securely store one or more of the received items of personal information in encrypted form. Encryption is based on an encryption key that is part of a cryptographic key pair. The first user data vault is specific to the first user. The encryption key is specific to the first user. In some embodiments, operation 212 is performed by a vaulting component the same as or similar to vaulting component 116 (shown in FIG. 1 and described herein).

At an operation 214, a first user token is created that identifies the first user. In some embodiments, operation 214 is performed by a token component the same as or similar to token component 118 (shown in FIG. 1 and described herein).

At an operation 216, the first user token is transferred to the online platform. In some embodiments, operation 216 is performed by a token component the same as or similar to token component 118 (shown in FIG. 1 and described herein).

At an operation 218, a validation request is received from a backend server of the particular organization requesting validation pertaining to the first user. The validation request includes the first user token. In some embodiments, operation 218 is performed by a request component the same as or similar to request component 120 (shown in FIG. 1 and described herein).

At an operation 220, the first user data vault is accessed based on the validation request. In some embodiments, operation 220 is performed by a vaulting component the same as or similar to vaulting component 116 (shown in FIG. 1 and described herein).

At an operation 222, a response to the validation request is transferred to the backend server. The response indicates a result of the validation. In some embodiments, operation 222 is performed by a request component the same as or similar to request component 120 (shown in FIG. 1 and described herein).

At an operation 224, method 200 either continues, or a new method starts (e.g., for a user who has previously registered with system 100 to perform identity verification, and now merely needs the subsequent authentication). At operation 224, an identity verification request is received on behalf of the first user, through the online platform. In some embodiments, operation 224 is performed by an input component the same as or similar to input component 108 (shown in FIG. 1 and described herein).

At an operation 226, it is determined whether the first user has previously been registered at the system. In some embodiments, operation 226 is performed by a registration component the same as or similar to registration component 110 (shown in FIG. 1 and described herein).

At an operation 228, responsive to determining the first user has been registered, one or more challenge protocols are initiated on the first client computing platform associated with the first user. In some embodiments, operation 228 is performed by a challenge component the same as or similar to challenge component 122 (shown in FIG. 1 and described herein).

At an operation 230, responsive to the one or more challenge protocols completing satisfactorily, the first user token is transferred to the online platform. In some embodiments, operation 230 is performed by a token component the same as or similar to token component 118 (shown in FIG. 1 and described herein).

At an operation 232, a second validation request is received from the backend server of the particular organization requesting a second validation pertaining to the first user. The second validation request includes the first user token. In some embodiments, operation 232 is performed by a request component the same as or similar to request component 120 (shown in FIG. 1 and described herein).

At an operation 234, the first user data vault is accessed based on the second validation request. In some embodiments, operation 234 is performed by a vaulting component the same as or similar to vaulting component 116 (shown in FIG. 1 and described herein).

At an operation 236, a second response to the second validation request is transferred to the backend server. The second response indicates a second result of the second validation. In some embodiments, operation 236 is performed by a request component the same as or similar to request component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate identity verification and authentication for users, wherein the users include a first user, wherein the first user is associated with a first client computing platform, the system comprising:
   electronic storage configured to store information electronically; and
   one or more hardware processors configured by machine-readable instructions to:
   receive, through an online platform associated with a particular organization, a first item of personal information pertaining to the first user;
   determine whether the first user has previously been registered at the system, based on the first item of personal information;
   responsive to determining the first user has not previously been registered:
   (i) receive, through the online platform, additional items of personal information pertaining to the first user, and
   (ii) effectuate storage of an item of credential information associated with the first user on the first client computing platform;
   perform one or more verification actions based on one or more of the received items of personal information pertaining to the first user;

responsive to the one or more verification actions completing satisfactorily, create a first user data vault to securely store one or more of the received items of personal information in encrypted form, wherein encryption is based on an encryption key that is part of a cryptographic key pair, wherein the first user data vault is specific to the first user, wherein the encryption key is specific to the first user, create a first user token that identifies the first user;

transfer the first user token to the online platform;

receive a validation request from a backend server of the particular organization requesting validation pertaining to the first user, wherein the validation request includes the first user token;

access the first user data vault based on the validation request;

transfer a response to the validation request to the backend server, wherein the response indicates a result of the validation;

receive, through the online platform, an identity verification request on behalf of the first user;

determine whether the first user has previously been registered at the system;

responsive to determining the first user has been registered, initiate one or more challenge protocols on the first client computing platform associated with the first user;

responsive to the one or more challenge protocols completing satisfactorily, transfer the first user token to the online platform;

receive a second validation request from the backend server of the particular organization requesting a second validation pertaining to the first user, wherein the second validation request includes the first user token;

access the first user data vault based on the second validation request; and transfer a second response to the second validation request to the backend server, wherein the second response indicates a second result of the second validation.

2. The system of claim 1, wherein the first item of personal information includes one or more of a name and an email address.

3. The system of claim 1, wherein the online platform includes a webpage associated with the particular organization, and wherein one or more of the items of personal information are received through an iframe included in the webpage.

4. The system of claim 1, wherein individual ones of the one or more verification actions are performed by external providers of verification services.

5. The system of claim 1, wherein the one or more hardware processors are further configured to:

prior to creating the first user data vault, receive information indicating the first user confirms the particular organization is authorized to use one or more of the items of personal information pertaining to the first user.

6. The system of claim 1, wherein the first user data vault is identified by a first vault identifier.

7. The system of claim 1, wherein the item of credential information is a biometric credential that include a private cryptographic key, wherein the private cryptographic key is unlocked by biometric information of the first user.

8. The system of claim 7, wherein the private cryptographic key is not part of the cryptographic key pair used for the encryption of the received items of personal information.

9. The system of claim 1, wherein the one or more hardware processors are further configured to:

receive, through a second online platform associated with a second organization that is different from the particular organization, the first item of personal information pertaining to the first user;

determine whether the first user has previously been registered at the system;

responsive to determining the first user has been registered, receive information indicating the first user confirms the second organization is authorized to use one or more of the items of personal information pertaining to the first user;

responsive to determining the first user has been registered, initiate a second set of challenge protocols on the first client computing platform associated with the first user;

responsive to the second set of challenge protocols completing satisfactorily, transfer the first user token to the second online platform;

receive a third validation request from a backend server of the second organization requesting a third validation pertaining to the first user, wherein the third validation request includes the first user token;

access the first user data vault based on the third validation request; and transfer a third response to the third validation request to the second backend server, wherein the third response indicates a third result of the third validation.

10. The system of claim 1, wherein the system includes an enclave service configured to provide decryption of information stored in the first user data vault, wherein the enclave service includes an enclave proxy and an enclave, wherein the enclave proxy is configured to provide secure access to and from the enclave service, wherein the enclave proxy communicates with the enclave over a secure local channel, wherein a private key of the cryptographic key pair that corresponds to the encryption key is stored in the enclave, wherein accessing the first user data vault includes an API call to the enclave proxy, and wherein the response to the validation request includes a response from the enclave proxy to the API call.

11. A method of facilitating identity verification and authentication for users, wherein the users include a first user, wherein the first user is associated with a first client computing platform, the method comprising:

receiving, through an online platform associated with a particular organization, a first item of personal information pertaining to the first user;

determining whether the first user has previously been registered at the system, based on the first item of personal information;

responsive to determining the first user has not previously been registered, receiving, through the online platform, additional items of personal information pertaining to the first user of a particular organization;

responsive to determining the first user has not previously been registered, effectuating storage of an item of credential information associated with the first user on the first client computing platform;

performing one or more verification actions based on one or more of the received items of personal information pertaining to the first user;

responsive to the one or more verification actions completing satisfactorily, creating a first user data vault to securely store one or more of the received items of personal information in encrypted form, wherein encryption is based on an encryption key that is part of a cryptographic key pair, wherein the first user data vault is specific to the first user, wherein the encryption key is specific to the first user, creating a first user token that identifies the first user;

transferring the first user token to the online platform;

receiving a validation request from a backend server of the particular organization requesting validation pertaining to the first user, wherein the validation request includes the first user token;

accessing the first user data vault based on the validation request;

transferring a response to the validation request to the backend server, wherein the response indicates a result of the validation;

receiving, through the online platform, an identity verification request on behalf of the first user;

determining whether the first user has previously been registered at the system;

responsive to determining the first user has been registered, initiating one or more challenge protocols on the first client computing platform associated with the first user;

responsive to the one or more challenge protocols completing satisfactorily, transferring the first user token to the online platform;

receiving a second validation request from the backend server of the particular organization requesting a second validation pertaining to the first user, wherein the second validation request includes the first user token;

accessing the first user data vault based on the second validation request; and transferring a second response to the second validation request to the backend server, wherein the second response indicates a second result of the second validation.

12. The method of claim 11, wherein the first item of personal information includes one or more of a name and an email address.

13. The method of claim 11, wherein the online platform includes a webpage associated with the particular organization, and wherein one or more of the items of personal information are received through an iframe included in the webpage.

14. The method of claim 11, wherein individual ones of the one or more verification actions are performed by external providers of verification services.

15. The method of claim 11, further comprising:
prior to creating the first user data vault, receiving information indicating the first user confirms the particular organization is authorized to use one or more of the items of personal information pertaining to the first user.

16. The method of claim 11, wherein the first user data vault is identified by a first vault identifier.

17. The method of claim 11, wherein the item of credential information is a biometric credential that include a private cryptographic key, wherein the private cryptographic key is unlocked by biometric information of the first user.

18. The method of claim 17, wherein the private cryptographic key is not part of the cryptographic key pair used for the encryption of the received items of personal information.

19. The method of claim 11, further comprising:
receiving, through a second online platform associated with a second organization that is different from the particular organization, the first item of personal information pertaining to the first user;

determining whether the first user has previously been registered at the system;

responsive to determining the first user has been registered, receiving information indicating the first user confirms the second organization is authorized to use one or more of the items of personal information pertaining to the first user;

responsive to determining the first user has been registered, initiating a second set of challenge protocols on the first client computing platform associated with the first user;

responsive to the second set of challenge protocols completing satisfactorily, transferring the first user token to the second online platform;

receiving a third validation request from a backend server of the second organization requesting a third validation pertaining to the first user, wherein the third validation request includes the first user token;

accessing the first user data vault based on the third validation request; and transferring a third response to the third validation request to the second backend server, wherein the third response indicates a third result of the third validation.

20. The method of claim 11, wherein the system includes an enclave service that provides decryption of information stored in the first user data vault, wherein the enclave service includes an enclave proxy and an enclave, wherein the enclave proxy provides secure access to and from the enclave service, wherein the enclave proxy communicates with the enclave over a secure local channel, wherein a private key of the cryptographic key pair that corresponds to the encryption key is stored in the enclave, wherein accessing the first user data vault includes an API call to the enclave proxy, and wherein the response to the validation request includes a response from the enclave proxy to the API call.

* * * * *